(12) United States Patent
Mariola et al.

(10) Patent No.: US 10,361,846 B2
(45) Date of Patent: Jul. 23, 2019

(54) SYSTEM AND METHOD FOR IDENTIFYING AND/OR MEASURING ORIENTATION MISMATCHES BETWEEN STATIONS

(71) Applicant: University of KwaZulu-Natal, Durban (ZA)

(72) Inventors: Marco Mariola, Durban (ZA); Abdul Rahim Mirza, Durban (ZA); Francesco Petruccione, Durban (ZA)

(73) Assignee: University of KwaZulu-Natal, Durban (ZA)

( * ) Notice: Subject to any disclaimer, the term of this patent is extended or adjusted under 35 U.S.C. 154(b) by 169 days.

(21) Appl. No.: 15/310,625

(22) PCT Filed: May 12, 2015

(86) PCT No.: PCT/IB2015/053479
§ 371 (c)(1),
(2) Date: Nov. 11, 2016

(87) PCT Pub. No.: WO2015/173727
PCT Pub. Date: Nov. 19, 2015

(65) Prior Publication Data
US 2017/0085375 A1    Mar. 23, 2017

(30) Foreign Application Priority Data
May 12, 2014    (ZA) .................................. 2014/03405

(51) Int. Cl.
*H04L 29/06*    (2006.01)
*H04L 9/08*    (2006.01)
*G09C 1/00*    (2006.01)

(52) U.S. Cl.
CPC .............. *H04L 9/0852* (2013.01); *G09C 1/00* (2013.01)

(58) Field of Classification Search
CPC ..................................................... H04L 9/0852
See application file for complete search history.

(56) References Cited

U.S. PATENT DOCUMENTS

| 5,539,562 A | * | 7/1996 | Morioka | ............ | H04B 10/1125 |
| | | | | | 398/131 |
| 2003/0030817 A1 | * | 2/2003 | Lee | ........................ | G01B 11/00 |
| | | | | | 356/491 |

FOREIGN PATENT DOCUMENTS

| GB | 2460252 A | 11/2009 | | |
| JP | 59190606 A | * | 10/1984 | ........... G01B 11/272 |

(Continued)

OTHER PUBLICATIONS

International Search Report for International Application No. PCT/IB2015/053479 dated Sep. 22, 2015, 3 pages.

(Continued)

*Primary Examiner* — Shawnchoy Rahman
(74) *Attorney, Agent, or Firm* — TraskBritt (57) ABSTRACT

This disclosure relates to a method and system implementing same for identifying and/or measuring an orientation mismatch and/or relative angular velocity between at least two spaced apart stations, the first and second stations having first and second reference frames, respectively, as well as a method and system implementing same for aligning reference frames. The method comprises receiving, at the second station, a reference signal from the first station, the reference signal having a predetermined coding associated with the first reference frame, and splitting the signal into first and second components with respect to the second reference frame by way of an optical device. The method then comprises measuring first and second intensities of the first and second components, and using the measured first and second intensities to determine an approximate angle of (Continued)

deviation, if any, between first and second reference frames. The determined angle may be used to correct the deviation.

10 Claims, 6 Drawing Sheets

(56) References Cited

FOREIGN PATENT DOCUMENTS

| | | | |
|---|---|---|---|
| JP | 04131833 A | * | 5/1992 |
| WO | 2011014184 A1 | | 2/2011 |

OTHER PUBLICATIONS

International Written Opinion for International Application No. PCT/IB2015/053479 dated Sep. 22, 2015, 7 pages.

* cited by examiner

SYSTEM AND METHOD FOR IDENTIFYING AND/OR MEASURING ORIENTATION MISMATCHES BETWEEN STATIONS

CROSS-REFERENCE TO RELATED APPLICATIONS

This application is a national phase entry under 35 U.S.C. § 371 of International Patent Application PCT/IB2015/053479, filed May 12, 2015, designating the United States of America and published in English as International Patent Publication WO 2015/173727 A1 on Nov. 19, 2015, which claims the benefit under Article 8 of the Patent Cooperation Treaty to South African Patent Application Serial No. 2014/03405, filed May 12, 2014.

TECHNICAL FIELD

This disclosure relates to a system and method for identifying and/or measuring an orientation mismatch and/or relative angular velocity between at least two spaced apart stations. The disclosure also relates to a system and method to align first and second apparatuses and/or stations and/or bases, for example, bases in a Quantum Key Distribution (QKD) system.

BACKGROUND

Reference frames of at least two remote systems that are not mechanically linked are often required to be aligned. Though the applications are various, in the case of Quantum Key Distribution (QKD) over mobile devices in free space, correct orientation of remote transmitting and receiving systems is vital. QKD is a quantum mechanical means of secret key exchange between two remote parties. The quantum systems (qubits) used in the implementation of QKD are often single particles of light known as photons. The bit values of the secret key to be exchanged are commonly coded within the orientation of the polarization of the photon. A variation or offset in the orientation of the reference frame of the transmitter and receiver would imply mismatched bases between the sender and receiver, resulting in an incorrect measurement of the polarization by the receiver. It is imperative, therefore, that both the local and remote reference frames are locked at identical orientations. Since only deterministic readings are useful, successful qubit distributions achieved with qubits prepared and measured in an identical basis, a misalignment between the intended and actual measurement of the system will induce a probabilistic outcome to the measurement of the qubit. This will result in a portion of the outcomes to reflect the incorrect bit value and, hence, increase Quantum Bit Error Rate (QBER).

Some conventional mobile free-space QKD systems require sophisticated tracking systems in order to keep suitable alignment or uplinks between remote transmitters and/or receivers. These systems are often expensive and make use of Polaroid lenses to align the remote transmitters and/or receivers with each other. In addition, some conventional systems employ feedback loops since power measured at receiver systems depends on the distance between the transmitter and receiver.

It is desired to have a simpler, less expensive and more robust means to align bases of remote systems.

BRIEF SUMMARY

According to a first aspect of the disclosure, there is provided a method for identifying and/or measuring an orientation mismatch and/or relative angular velocity between two spaced apart stations and/or apparatuses and/or bases and/or objects, wherein the first station and/or apparatus and/or base has an associated first reference frame and the second station and/or apparatus and/or base has an associated second reference frame, the method comprising:

receiving, at the second station, a reference signal from the first station and/or apparatus and/or base, the reference signal having a predetermined coding associated with the first reference frame;

splitting the received reference signal into at least first and second components with respect to the second reference frame by way of an optical device;

measuring first and second intensities of the first and second components of the split reference signal, wherein the measured intensities are functions of characteristics of the optical device and relative orientations of the reference signal coding with respect to the second reference frame; and using the measured first and second intensities to determine an approximate angle of deviation, if any, between first and second reference frames.

The method may comprise correcting the measured first and second intensities for at least characteristics of the optical device and using the corrected first and second intensities to determine the angle of deviation.

It will be understood that the determination of the angle of deviation may be independent of incident power of the reference signal received.

The method may comprise emitting the reference signal from a laser at the first station, wherein the predetermined coding of the reference signal is a linear polarization of the reference signal. Optionally, an orientation of polarization of the reference signal may depend on the orientation of the first reference frame.

The method may comprise splitting the reference signal received from the laser into first and second substantially orthogonal optical components with an optical device in the form of a polarized beam splitter (PBS).

The method may comprise correcting the measured first and second intensities for dependency on an intensity of the reference signal and/or to account for non-ideal characteristics of the PBS.

The method may comprise:
characterizing the PBS; and
determining an error function associated with the characterized PBS, wherein the error function is operable to compensate for non-ideal characteristics of the PBS.

The method may comprise:
normalizing the received first and second intensities of the first and second components with respect to their combined total power; and
applying the error function associated with the PBS to the normalized first and second intensities so as to correct or compensate for the non-ideal characteristics of the PBS.

The PBS in this disclosure may effectively serve as an angular sensor to determine the angle of deviation.

The method may comprise receiving the reference signal at an identical orientation in the second reference frame as it was created in the first reference frame.

A discrepancy in the measured orientation may be a direct result of the mismatched orientation of the first and second reference frames.

The first station may comprise or be in the form of a first apparatus located at a first location and the second station may comprise or be in the form of a second apparatus located at a second location remote from the first location.

The method may comprise transmitting a reference signal from a laser mounted at or proximate to the first apparatus.

The method may comprise measuring the first and second intensities by way of a first and second sensor.

The method may comprise using the corrected or compensated first and second intensities and pre-determined trigonometric ratios to determine an approximate angle of deviation.

The method may comprise adding the error function to the determined approximate angle to determine the angle of deviation.

According to a second aspect of the disclosure, there is provided a system for identifying and/or measuring an orientation mismatch and/or relative angular velocity between two spaced apart stations and/or apparatuses and/or bases and/or objects, wherein the first station and/or apparatus and/or base has an associated first reference frame and the second station and/or apparatus and/or base has an associated second reference frame, the system comprising:
 an optical device configured to receive a reference signal from the first station and/or apparatus and/or base, the reference signal having a predetermined coding associated with the first reference frame, wherein the optical device is configured to split the received reference signal into first and second components with respect to the second reference frame;
 a first sensor configured to measure a first intensity of the first component of the reference frame, wherein the measured first intensity is a function of one or more of characteristics of the optical device, relative orientation of the reference signal coding with respect to the second reference frame, and transmitter of the reference signal;
 a second sensor configured to measure a second intensity of the second component of the reference frame, wherein the measured second intensity is a function of one or more of the characteristics of the optical device, relative orientations of the reference signal coding with respect to the second reference frame, and transmitter of the reference signal; and
 a means for using the received first and second intensities to determine an approximate angle of deviation, if any, between first and second reference frames.

The means for using the received first and second intensities may comprise one or a combination of a processor and discrete electronic components.

The processor may be configured to correct the measured first and second intensities for at least characteristics of the optical device, the processor being configured to use the corrected first and second intensities to determine the angle of deviation.

It will be understood that the system may be independent of incident power of the reference signal received in determining the angle of deviation.

The system may comprise a laser located at the first station, wherein the laser may be configured to generate and transmit a reference signal in the form of a laser signal or beam with predetermined coding.

The predetermined coding of the reference signal may be a linear polarization thereof. The orientation of polarization of the reference signal may depend on the orientation of the first reference frame.

The optical device may be an optical beam splitter in the form of a polarized beam splitter (PBS) configured to split the reference signal into first and second substantially orthogonal optical components.

The PBS may be orientated so that its bases are in line with the second reference frame.

The system may be operable to:
 normalize the received first and second intensities of the first and second components with respect to their combined total power;
 apply an error function associated with the PBS to the normalized first and second intensities so as to correct or compensate for the non-ideal characteristics of the PBS; and
 use the corrected or compensated first and second intensities and pre-determined trigonometric ratios to determine an approximate angle of deviation between the first and second reference frames.

The sensors may capture the first and second intensities after the reference signal has been split at the PBS.

According to a third aspect of the disclosure, there is provided a method of aligning a first reference frame of a first station and/or apparatus and/or base with a second reference frame of a second station and/or apparatus and/or base, the method comprising:
 determining an approximate angle of deviation between the first station and/or apparatus and/or base and the second station and/or apparatus and/or base by:
  receiving, at the second station and/or apparatus and/or base, a reference signal from the first station and/or apparatus and/or base, the reference signal having a predetermined coding associated with the first reference frame;
  splitting the reference signal into at least first and second components with respect to the second reference frame by way of an optical device;
  measuring first and second intensities of the first and second components of the split reference signal, wherein the measured intensities are functions of characteristics of the optical device and relative orientations of the reference signal coding with respect to the second reference frame; and
  using the measured first and second intensities to determine an approximate angle of deviation between first and second reference frames; and
 using the determined angle of deviation to displace the second station and/or apparatus and/or base substantially into alignment with the second apparatus station and/or apparatus and/or base.

According to a fourth aspect of the disclosure, there is provided a system for aligning a first reference frame of a first station and/or apparatus and/or base with a second reference frame of a second station and/or apparatus and/or base, the system comprising:
 an optical device configured to receive a reference signal from the first station and/or apparatus and/or base, the reference signal having a predetermined coding associated with the first reference frame, wherein the optical device is configured to split the reference signal into first and second components with respect to the second reference frame;
 a first sensor configured to measure a first intensity of the first component of the reference frame, wherein the measured first intensity is a function of one or more of characteristics of the optical device, relative orientation of the reference signal coding with respect to the second reference frame, and transmitter of the reference signal;

a second sensor configured to measure a second intensity of the second component of the reference frame, wherein the measured second intensity is a function of one or more of the characteristics of the optical device, relative orientations of the reference signal coding with respect to the second reference frame, and transmitter of the reference signal;

a means for using the received first and second intensities to determine an approximate angle of deviation between first and second reference frames; and a displacement means configured to displace the second station and/or apparatus and/or base responsive to the determined angle of deviation to thereby align the first and second station and/or apparatus and/or base, or their first and second reference frames substantially, in use.

According to a fifth aspect of the disclosure, there is provided an apparatus and/or station for comprising a receiver arrangement configured to:

receive, from a first sensor, a measurement of a first intensity of a component of a reference signal split by an optical device at a second station having a second reference frame, wherein the reference signal is transmitted from and has a predetermined coding associated with a first station having a first reference frame;

receive, from a second sensor, a measurement of a second intensity of another component of the reference signal split by the optical device at the second station; and use the received first and second intensities to determine the angle of deviation, if any, between first and second reference frames.

The receiver arrangement may be configured to correct the measured first and second intensities for at least characteristics of the optical device, the arrangement being further configured to use the corrected first and second intensities to determine the angle of deviation as described above.

The receiver arrangement may comprise discrete components.

According to a sixth aspect of the disclosure, there is provided a non-transitory computer-readable medium storing a set of computer-readable instructions that, when executed by a suitable computing device, causes the same to:

receive, from a first sensor, a measurement of a first intensity of a component of a reference signal split by an optical device at a second station having a second reference frame, wherein the reference signal is transmitted from and has a predetermined coding associated with a first station having a first reference frame;

receive, from a second sensor, a measurement of a second intensity of another component of the reference signal split by the optical device at the second station; and use the received first and second intensities to determine the angle of deviation, if any, between first and second reference frames.

The instructions may cause the suitable computing device to correct the measured first and second intensities for at least characteristics of the optical device, and further use the corrected first and second intensities to determine the angle of deviation as described above.

DETAILED DESCRIPTION

In the following description, for purposes of explanation, numerous specific details are set forth in order to provide a thorough understanding of an embodiment of the present disclosure. It will be evident, however, to one skilled in the art that the present disclosure may be practiced without these specific details.

Furthermore, it should be pointed out that the same parts described in the different embodiments are denoted by the same reference numbers and the same component names and the disclosures made throughout the description can be transposed in terms of meaning to the same parts bearing the same reference numbers or same component names.

Figure 1:
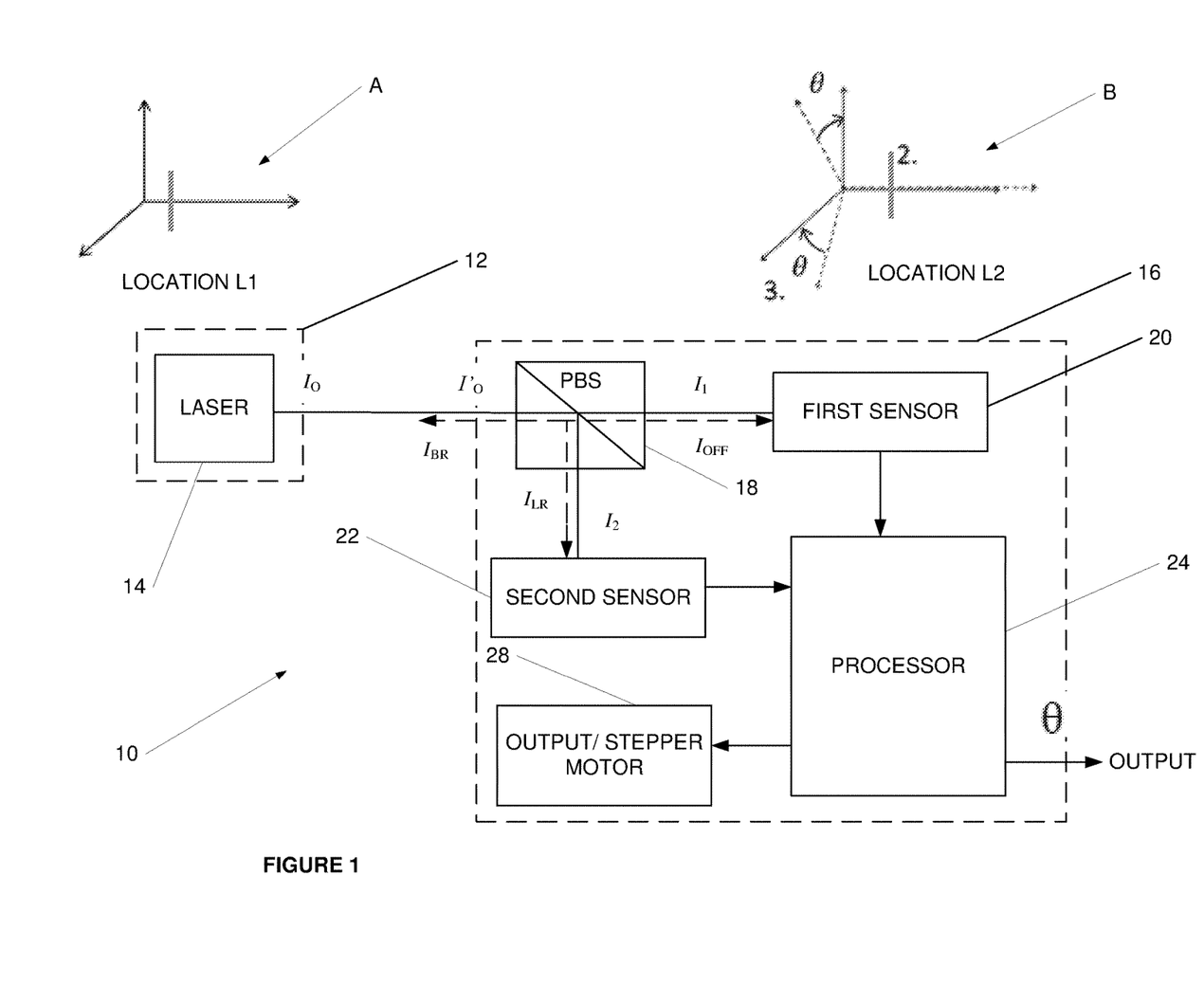
FIG. 1 shows a schematic drawing of an example embodiment of a system in accordance with the disclosure.

Referring to FIG. 1 of the drawings, a system for determining an angle of deviation between a first or local reference frame A associated with a first apparatus/system/station at a first location L1 and a second or remote reference frame B associated with a second apparatus/system/station at a second location L2 is generally indicated by reference numeral 10.

Moreover, as will be described herein, the system 10 is for aligning the first and second apparatuses with respect to their reference frames A and B based on at least the determined angle of deviation $\theta$. The system 10 may be applied to any system that requires the alignment of mechanical parts (e.g., shafts, satellites), or a system that requires angular sensing to determine an angle between two remote locations (e.g., inclination of a road or other civil application). However, reference will further be made to the use of the system 10 in a Quantum Key Distribution (QKD) over mobile devices communication system application with the first apparatus in the form of a first communications receiver and/or transmitter located at the first location L1 and the second apparatus in the form of a second communications receiver and/or transmitter located at the second location L2.

By way of background, as the medium used by mobile devices is free space, a polarization-encoded QKD scheme is employed in QKD over mobile devices communication systems. Though it is known that the polarization of light, as it propagates through the atmosphere, is not significantly altered, the relative orientation of the communication apparatuses located at remotely spaced locations is critical to a successful key transmission.

The correct orientation of the remote communication apparatuses/systems is vital due to the fact that a relative error would imply mismatched bases between the sender and receiver. Since deterministic and, hence, useful, bit distributions are only achieved with qubits prepared and measured in an identical basis, a misalignment between the intended and actual measurement of the second system will induce an error to the outcome of the measurement of the qubit. As a portion of the outcomes will reflect the incorrect bit value, an increase Quantum Bit Error Rate (QBER) will result.

In the QKD regime, the system 10 may essentially be configured to determine an angle of deviation and align reference frames A and B of two remote first and second communication apparatuses (not shown) located at first and second locations L1, L2, respectively, which are not mechanically linked. In this way, relative errors between the first and second communication apparatuses due to misaligned bases are mitigated.

To this end, the system 10 comprises a so-called transmitter 12 comprising a laser 14 mounted on the first communication apparatus (not shown) at L1. The system 10 further comprises a so-called receiver 16 mounted on the second communication apparatus (not shown) at L2 remote from L1. In this regard, L1 may also be referred to as a local location, and L2 a remote location for the purposes of discussion. Further, it will be noted that the second communication apparatus at location L2 transmits data to the first communication apparatus in a communication channel. The first communication apparatus may be seen as a data receiver communication apparatus, whereas the second communication apparatus may be seen as a transmitter communication apparatus, wherein the second communication apparatus is configured to align itself with the first communication apparatus for the reasons described herein.

In any event, the laser 14 is configured to generate a laser reference signal that has a predefined coding or, in other words, for example, is linearly polarized, wherein the orientation of polarization depends on the orientation of the reference frame of the first apparatus. The laser 14 may, therefore, be configured to generate and transmit a polarized reference signal or beam as per the first reference frame A to the receiver 16.

The laser 14 is typically configured to generate a reference signal with an intensity, $I_0$, as received at the receiver 16 as $I'_0$.

The receiver 16 comprises an optical device in the form of a polarized beam splitter (PBS) 18, first sensor 20, second sensor 22, a processor 24, and optionally a stepper motor 28. The PBS 18 may be of the conventional type wherein axes of polarization of the PBS 18 are tilted or aligned with the remote reference frame B. The PBS 18 is configured to receive a polarized reference signal from the laser 14 and split the same into orthogonal or substantially orthogonal components. The PBS 18 is generally characterized prior to use to determine aspects characterization data as described herein.

The sensors 20, 22 are optical detectors or photon detectors configured to measure the intensity of the received orthogonal components, substantially in a conventional fashion. The sensors 20, 22 may be selected from a group comprising silicon sensors, charged coupled devices (CCDs), complementary metal oxide semiconductors (CMOS), nitrocellulose sensors, or the like. By way of background, it will be understood that the intensities of the first and second orthogonal components measured by the sensors 20, 22 (first and second intensities, $I_1$ and $I_2$, respectively) may be given, under ideal conditions, by Malus's Law:

$$I_1 = I'_0 \cos^2\theta \tag{1}$$

$$I_2 = I'_0 \sin^2\theta, \tag{2}$$

wherein $I'_0$ is the intensity of the reference signal received by the PBS 18 and $\theta$ is effectively the angle of deviation between the first and second apparatuses.

It will be appreciated that in an example embodiment where the signal from laser 14 is aligned at 45 degrees to each polarization axis of the PBS 18 or the polarization basis of the transmitter 12, $I_1 = I_2$.

As alluded to above, it is important, for example, in the communication application that the system 10 must recognize in which direction the bases (of the first and second communication apparatuses associated with the transmitter 12 and receiver 16) must rotate and fix the position where the bases align. It follows that it is important for the system 10 to know the instantaneous angle between the two bases but it must not be accurate to lock the absolute vertical position.

Unfortunately, as the PBS 18 is not ideal, the above equations are not entirely accurate. Therefore, a characterization of the PBS 18 is required as mentioned above to determine characterization data associated with a particular PBS 18. In particular, it will be noted from FIG. 1, particularly from the PBS 18, that $I_{BR}$ is the intensity of background or base reflected light from the PBS 18, $I_{LR}$ is a portion of the light that is reflected in the lateral side of the PBS 18, and $I_{OFF}$ is the intensity that is transmitted through the PBS 18 to the first sensor 20, irrespective of the orientation of the polarization of the reference signal. In other words, the background or base reflection, as well as $I_{OFF}$, is independent of the change in polarization orientation of the incident beam, $I'_0$.

By way of example, $I_{OFF}$ (FIG. 1) is approximately 1% of the total power Ptot and $I_{LR}$ is approximately 9% of Ptot, wherein $Ptot = I_1(\theta) + I_2(\theta)$. It will be understood that these values may be dependent on the PBS 18 in question and is determined for each PBS 18. In this regard, the formulas above should, therefore, be:

$$I_1(\theta) = (I'_0 - I_{BR} - I_{LR} - I_{OFF})\cos^2\theta + I_{OFF} \tag{3}$$

$$I_2(\theta) = (I'_0 - I_{BR} - I_{LR} - I_{OFF})\sin^2\theta + I_{LR}. \tag{4}$$

The total power measured is given by the difference $P_{tot} = I'_0 - I_{BR}$:

$$P_{tot} = I_1(\theta) + I_2(\theta) = I'_0 - I_{BR} - I_{LR} - I_{OFF} + I_{OFF} + I_{LR} = I'_0 - I_{BR} \tag{5}$$

The equations (3) and (4) can by written as:

$$I_1(\theta) = (P_{tot} - I_{LR} - I_{OFF})\cos^2\theta + I_{OFF} \tag{6}$$

$$I_2(\theta) = (P_{tot} - I_{LR} - I_{OFF})\sin^2\theta + I_{LR}. \tag{7}$$

$I_{BR}$, $I_{LR}$, $I_{OFF}$, and, optionally, Ptot, may approximately form part of the characterization data associated with the PBS 18. It will be appreciated that the characterization data may vary for each PBS 18. Thus, it is important to characterize each PBS 18 to determine characterization data associated therewith.

The processor 24 is configured to correct or condition intensities measured by the sensors 20, 22 for dependency on an intensity of the reference signal and flaws in the PBS 18. This may be effectively achieved by using determined characterization data by way of at least the equations (3) and (4) or (6) and (7) above.

The processor 24 may be in the form of one or more processors, microprocessors, controllers, or any other suitable computing device, resource, hardware, software, or embedded logic. The receiver 16 and/or transmitter 12 may, therefore, comprise a non-transitory machine-readable medium, e.g., memory in the processor 24, main memory, and/or hard disk drive, which carries a set of instructions to direct the operation of the processor 24.

In other example embodiments, the processor 24, in particular, one or more functions thereof, may be replaced by discrete electronic components to achieve the ends described herein.

The processor 24 is configured to use corrected intensities to determine the angle of deviation, if any, between first and second reference frames A and B.

It will be noted that in view of the above, the module 26 may employ the following equation to determine the angle of deviation between the two reference frames A and B:

$$\theta(I_1, I_2) = \operatorname{atan}\left(\sqrt{\frac{I_{2(\theta)} - I_{LR}}{I_{1(\theta)} - I_{OFF}}}\right) + \partial\theta(I_1, I_2), \quad (8)$$

wherein, $\partial\theta(I_1, I_2)$ is the error given by each measurement that may be approximated by the following polynomial function, which is also dependent on the PBS 18:

$$\partial\theta(I_1, I_2) = 5 \cdot 10^{-16}\left(\frac{I_2}{I_1}\right)^6 - 6 \cdot 10^{-13}\left(\frac{I_2}{I_1}\right)^5 + 3 \cdot 10^{-10}\left(\frac{I_2}{I_1}\right)^4 - \\ 8 \cdot 10^{-8}\left(\frac{I_2}{I_1}\right)^3 + 10 \cdot 10^{-5}\left(\frac{I_2}{I_1}\right)^2 - 0.0011\left(\frac{I_2}{I_1}\right) + 0.0362 \quad (9)$$

It will be understood that the processor 24 is configured to correct the intensities of the first and second components, as well as determine the angle of deviation substantially simultaneously by use or application of equation (8), and equations (3) and (4), or (6) and (7).

Figure 2:
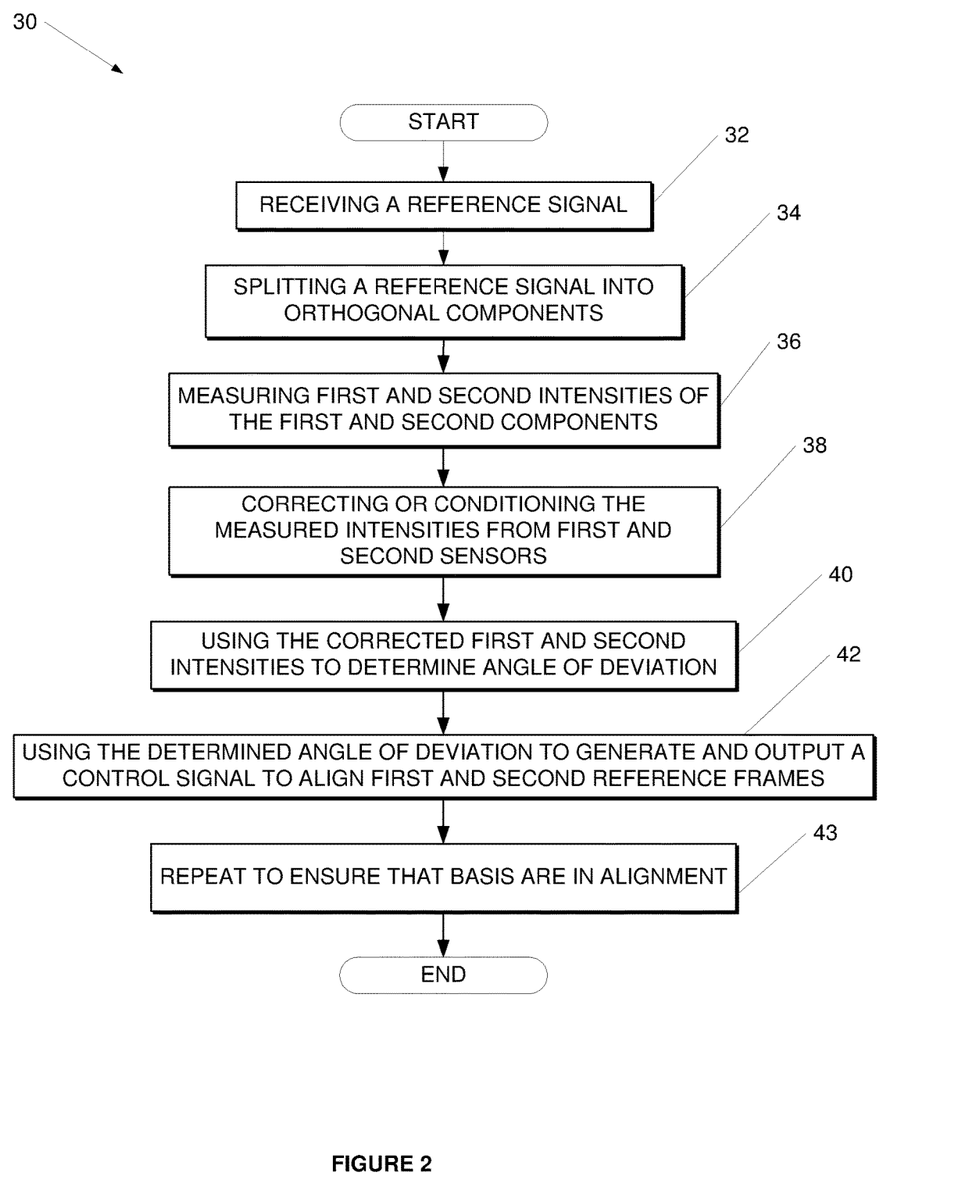
FIG. 2 shows a high level flow diagram of a method in accordance with an example embodiment of the disclosure.
Figure 3:
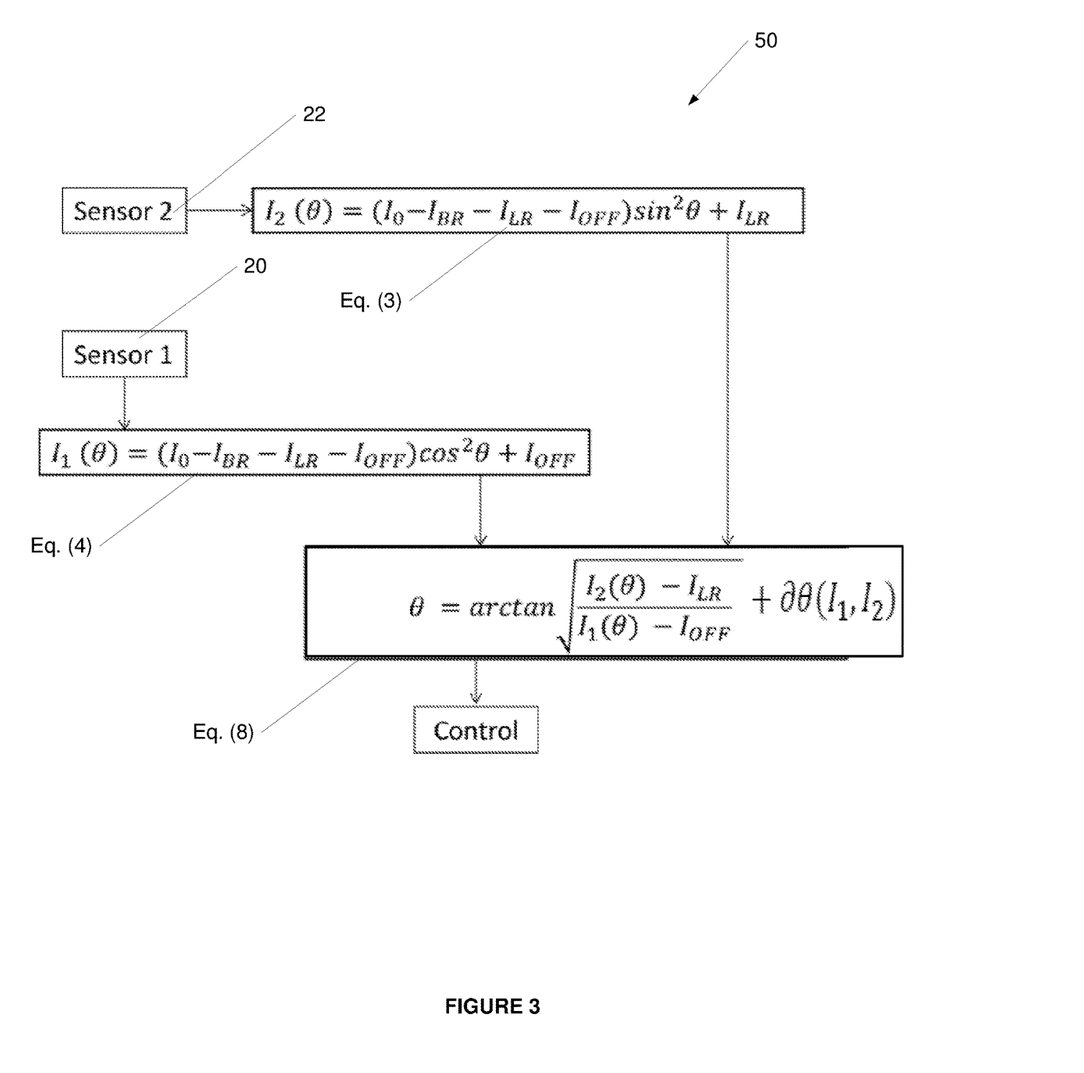
FIG. 3 shows a mathematical flow diagram of a method in accordance with an example embodiment of the disclosure.
Figure 4:
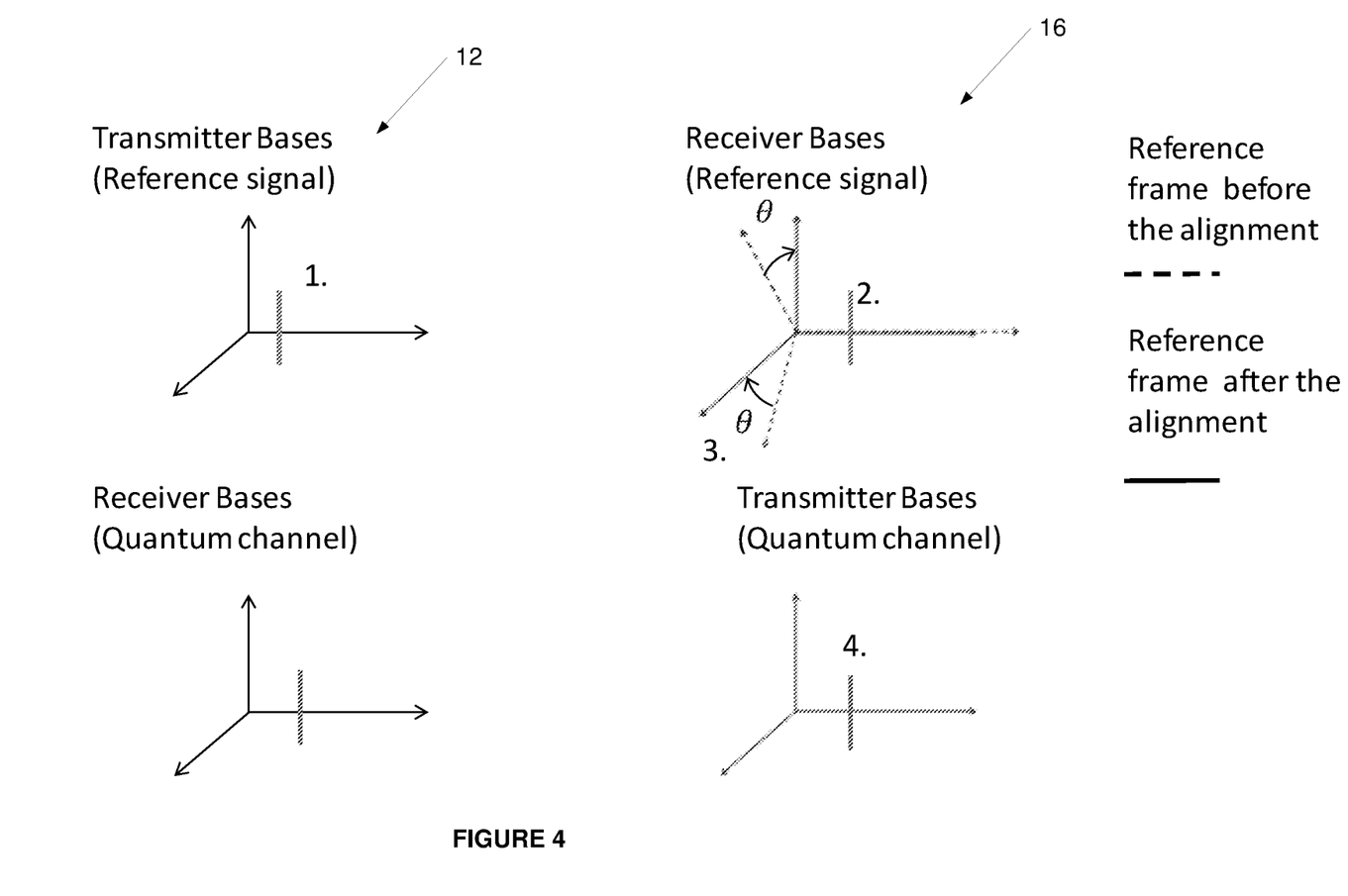
FIG. 4 shows a diagram of an example of a physical working of the disclosure in accordance with an example embodiment of the disclosure.

Example embodiments will now be further described in use with reference to FIGS. 2 to 4. The example methods and examples shown in FIGS. 2 to 4 are described with reference to FIG. 1, although it is to be appreciated that the example methods may also be applicable to other systems (not illustrated).

In FIG. 2, a high-level flow diagram of a method in accordance with an example embodiment of the disclosure is generally indicated by reference numeral 30.

The method 30 is generally employed, for example, when the first communication apparatus at location L1 receives communication from second communication apparatus at remote location L2. The method 30 comprises the step of, at the first communication apparatus in response to receiving a communication from the second communication apparatus, operating the transmitter 12 so that the laser 14 is actuated to generate and transmit a linear polarized reference signal or beam to the receiver 16.

The method 30 further comprises, at block 32, the PBS 18 receiving the reference signal with an intensity $I'_0$ from the laser 14 and splitting, at block 34, the same into two orthogonal components, viz., first and second orthogonal components, as a function of the characteristics of the PBS 18 and the relative orientation of the polarization of the signal from laser 14 with respect to the reference frame B.

The method 30 then comprises measuring, at block 36, by way of the first sensor 20, the first intensity $I_1$.

Similarly, also at block 36, the method 30 comprises measuring, by way of the second sensor 22, the second intensity $I_2$ in a substantially simultaneous fashion.

The method 30 comprises correcting or conditioning, at block 38 by way of the processor 24, the first and second intensities $I_1$ and $I_2$.

The method 30 then comprises using, at block 40, by way of the processor 24, the corrected or conditioned intensities $I_1$ and $I_2$, particularly a total power given by the sum of $I_1$ and $I_2$ and $I_1$ or $I_2$, or the ratio $I_1/I_2$, and an error function as previously described to determine the angle of deviation between the first and second reference frames A and B.

The method 30 may comprise using, at block 42, the determined angle of deviation to generate and output a suitable control signal to the optional stepper motor 28 to align the bases between the communication apparatuses. The signal may be suitable to enable the stepper motor 28 to proportionately operate to bring the first and second reference frames A and B into alignment. Instead, or in addition, corrected intensities may be used to drive the stepper motor 28.

It will be noted that the method 30 may be repeated, at block 43, on an ad hoc basis when required, and/or periodically to ensure that the basis are always in alignment.

In FIG. 3, a mathematical flow diagram is generally indicated by reference numeral 50. The mathematical flow of method 30 may correspond to the operational steps taken by the processor 24 in performing the steps of blocks 38 and 40 as described above with reference to FIG. 2.

In particular, the processor 24 is configured to determine a corrected $I_1$ by using the equation (3) or corresponding equation (6). Similarly, processor 24 is configured to determine a corrected $I_2$ by using the equation (4) or corresponding equation (7).

The corrected first and second intensities $I_1$ and $I_2$ are then used by the processor 24 to calculate the approximate angle θ by using equation (8).

In FIG. 4, an example embodiment of the disclosure is shown in use in a communication channel setup.

In use, the transmitter 12 shoots a reference signal in the direction of the receiver 16.

The receiver 16 measures the first and second intensities $I_1$ and $I_2$ of the reference signals in order to find θ in a manner as described above.

The bases of the receiver 16 are rotated along with the quantum channel in accordance with the determined angle of deviation.

The base of the quantum channel of the transmitter 12 is aligned to the receiver 16 and is ready to transmit the single photons.

Figure 5:
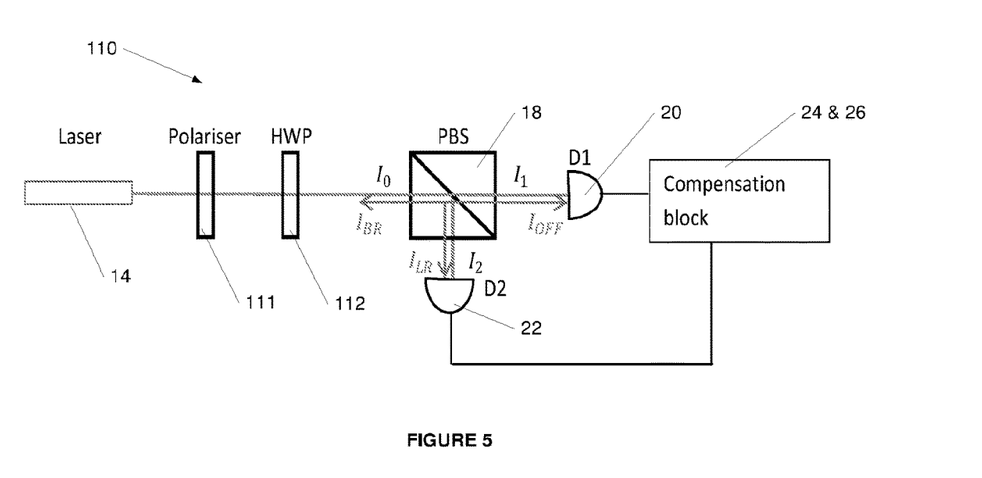
FIG. 5 shows a schematic drawing of an experimental set up of a system in accordance with an example embodiment of the disclosure showing a testing unit comprising a polarizer and half wave plate.

FIG. 5 shows an experimental setup of a system 110 in accordance with an example embodiment. The system 110 is substantially similar to system 10 and similar parts will be referred to by the same reference numerals. The system 110 comprises a polarizer 111, which is not illustrated in FIG. 1, to polarize the reference signal and half wave plate (HWP) 112. It will be understood that the polarizer 111 and HWP 112 form part of an experimental testing unit used by the system 110.

Figure 6:
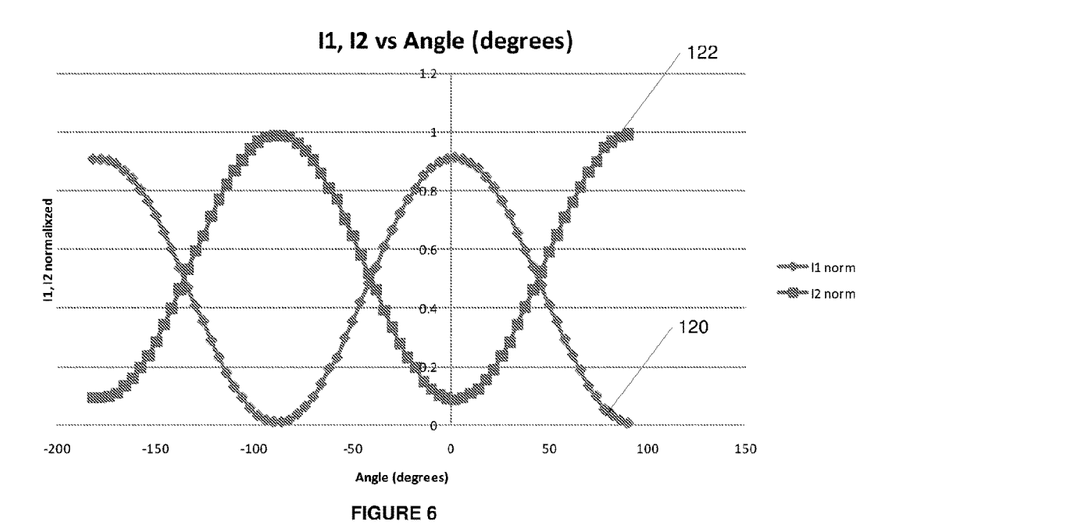
FIG. 6 shows a graph of experimental normalized measures of measured first and second intensities of the first and second components versus the angle of deviation between first and second apparatuses.

In particular, in the experimental system 110, the laser beam from the laser 14 was vertically polarized by way of the polarizer 111 and, via the HWP 112, the polarization was changed. The polarization angle was changed from 0 to 360 degrees. Each measure taken is normalized with respect to the total power Ptot=$I_1(\theta)+I_2(\theta)$. The results of the normalized measures are shown in FIG. 6, wherein a calibration curve of $I_1$ compensated is indicated by reference numeral 120 and a calibration curve of $I_2$ compensated is indicated by reference numeral 122. The calibration curves 120 and 122 are in accordance with the equations (6) and (7) provided above.

Using equation (8) at 45 degrees for different powers of laser intensity results in the measurements provided in Table 1, which follows below:

TABLE 1

Power of reference signal vs error of one example embodiment

| Power | 1.25 mW | 1.95 mW | 2.7 mW | 3.32 mW | 4.06 mW |
|---|---|---|---|---|---|
| Error (Degrees) | 0.11 | 0.05 | 0.13 | 0.18 | 0.10 |

From the results in Table 1, the system as described herein is laser intensity invariant.

The same experimental system 110 can be used to measure the angle of deviation when the average power of the laser reference signal is 4.06 mW as shown in Table 2 below:

TABLE 2

Angle and power of reference signal measurements

| Ang (degrees) | Ang (rad) | I1 (mW) | I2 (mW) | Ptot (mW) | Measured angle (rad) | Measured angle (degrees) | Absolute Error (degrees) |
|---|---|---|---|---|---|---|---|
| 86.00 | 1.50 | 0.05 | 3.98 | 4.03 | 1.50 | 86.00 | 0.00 |
| 82.00 | 1.43 | 0.11 | 3.91 | 4.02 | 1.44 | 82.39 | 0.39 |
| 78.00 | 1.36 | 0.22 | 3.80 | 4.02 | 1.37 | 78.25 | 0.25 |
| 74.00 | 1.29 | 0.34 | 3.68 | 4.02 | 1.30 | 74.72 | 0.72 |
| 70.00 | 1.22 | 0.51 | 3.52 | 4.03 | 1.23 | 70.57 | 0.57 |
| 66.00 | 1.15 | 0.69 | 3.35 | 4.04 | 1.17 | 66.78 | 0.78 |
| 62.00 | 1.08 | 0.91 | 3.13 | 4.04 | 1.09 | 62.59 | 0.59 |
| 58.00 | 1.01 | 1.16 | 2.89 | 4.05 | 1.02 | 58.27 | 0.27 |
| 54.00 | 0.94 | 1.42 | 2.64 | 4.06 | 0.94 | 54.05 | 0.05 |
| 50.00 | 0.87 | 1.69 | 2.37 | 4.06 | 0.87 | 49.78 | 0.22 |
| 46.00 | 0.80 | 1.92 | 2.14 | 4.06 | 0.81 | 46.18 | 0.18 |
| 42.00 | 0.73 | 2.20 | 1.87 | 4.07 | 0.73 | 41.87 | 0.13 |
| 38.00 | 0.66 | 2.44 | 1.63 | 4.07 | 0.66 | 38.00 | 0.00 |
| 34.00 | 0.59 | 2.68 | 1.40 | 4.08 | 0.59 | 34.07 | 0.07 |
| 30.00 | 0.52 | 2.91 | 1.16 | 4.07 | 0.52 | 29.79 | 0.21 |
| 26.00 | 0.45 | 3.10 | 0.97 | 4.07 | 0.45 | 26.01 | 0.01 |
| 22.00 | 0.38 | 3.31 | 0.78 | 4.09 | 0.38 | 21.60 | 0.40 |
| 18.00 | 0.31 | 3.45 | 0.64 | 4.09 | 0.31 | 17.83 | 0.17 |
| 14.00 | 0.24 | 3.59 | 0.53 | 4.12 | 0.24 | 14.02 | 0.02 |
| 10.00 | 0.17 | 3.67 | 0.43 | 4.10 | 0.17 | 9.45 | 0.55 |
| 6.00 | 0.10 | 3.73 | 0.37 | 4.10 | 0.05 | 3.01 | 2.99 |

In another example embodiment, a characteristic curve of $I_1$ 120 and $I_2$ 122 (FIG. 6) for the PBS 18 is obtained during calibration thereof. Taking the commons points of the calibration curves 120, 122 as the points of the alignments of the bases, the system is able to align the transmitter and receiver without ambiguity for more than plus 50 or minus 50 degrees.

In this example embodiment, the required rotation is found by comparing the measured intensities from the first and second sensors 20, 22 to the characteristic curve of the PBS 18. No calculations are required in this example embodiment.

It follows that in this example embodiment, the PBS 18 is characterized with respect to varying inputs and coding of a calibration reference signal in order to generate calibration curves 120, 122.

Figure 7:
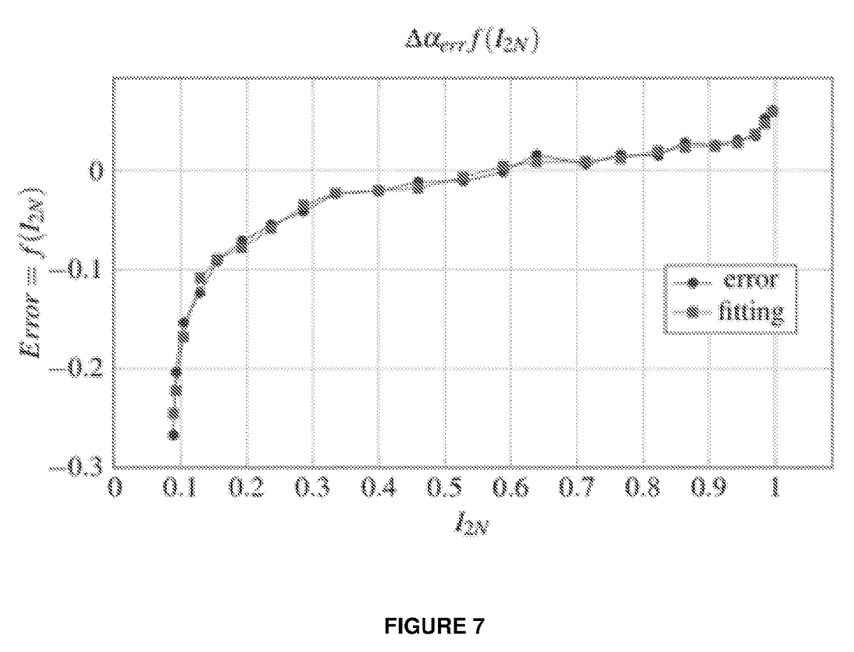
FIG. 7 shows a graph of error function output in response to varying input power of the reference signal due to the change of the angle $\theta$ of the reference signal and is calculated using the normalized intensity $I_2$.

In FIG. 7, experimental results of another example implementation of the disclosure are shown graphically. In particular, as described herein, once a PBS is characterized, it is possible to find an error function able to compensate the defects and mimic the real behavior. This function is calculated from the normalized value of $I_1$ and $I_2$. For the PBS under discussion, error in response to the response of the function is shown in FIG. 7.

In this example embodiment, the error function is calculated by the normalization of the signal $I_2$ with respect to the total power called $I_{2N}$. The error is the difference between the measured angle $\theta$ and the angle $\theta_C$ measured from the scale of the HWP. The error function corresponds to the following polynomial function:

$$\Delta\alpha_{err}(I_{2N}) = -4.4183529 \cdot 10^3 \cdot I_{2N}^{10} + 2.6516046 \cdot 10^4 \cdot I_{2N}^9 - \qquad (10)$$
$$6.9067889 \cdot 10^4 \cdot I_{2N}^8 + 1.0242461 \cdot 10^5 \cdot I_{2N}^7 -$$
$$9.5322069 \cdot 10^4 \cdot I_{2N}^6 + 5.7860943 \cdot 10^4 \cdot I_{2N}^5 -$$
$$2.3060932 \cdot 10^4 \cdot I_{2N}^4 + 5.9228588 \cdot 10^3 \cdot I_{2N}^3 -$$
$$9.3386548 \cdot 10^2 \cdot I_{2N}^2 + 8.1854136 \cdot 10 \cdot - 3.13918375.$$

The curve can be found by interpolation of a polynomial curve or by any kind of fitting curve family that represents the better approximation of the experimental points for the normalized variable $I_{2N}$.

By way of example, if the example embodiment system under discussion must be aligned when the polarization direction of the laser beacon is 45 degrees, the following results for different value of power are obtained:

TABLE 3

Power of reference signal vs error of an example embodiment

| Total power (mW) | 1.28 | 1.93 | 2.67 | 3.30 | 4.06 |
|---|---|---|---|---|---|
| Error at 45° corrected | 0.17 | 0.11 | 0.10 | 0.24 | 0.06 |
| Error at 45° not corrected | 0.41 | 0.47 | 0.64 | −0.36 | 0.61 |

It will be appreciated that the first row of the table represents the average laser power used to calculate the error alignment for 45 degrees. The second row represents the calculated angle using the error function $\Delta\alpha_{err}(I_{2N})$ by way of the following equation:

$$\theta = \arctan\sqrt{\frac{I_2}{I_1}} + \Delta\alpha_{err}(I_{2N}) \quad (11)$$

The third row is the calculated angle without using the correction.

Whereas, conventional systems used to align remote devices and apparatuses consist of expensive Polaroid lenses. This disclosure does not use the same. In addition, conventional systems further have feedback loops since power measured by the detectors depends on the distance between the devices. The system as described herein does not require feedback loops since it concurrently measured the orthogonal polarizations and can, hence, directly calculate the relative angle between the reference frames of the remote apparatuses. The system is further independent of the power of the transmission of the reference signal and is only limited by the sensitivity of the detectors. Due to the few components used in the system, it is more robust and much more cost effective.

The invention claimed is:

1. A method for identifying and/or measuring an orientation mismatch and/or relative angular velocity between at least two spaced apart stations including a first station and a second station, wherein the first station has an associated first reference frame and the second station has an associated second reference frame, the method comprising:
    receiving, at the second station, a reference signal from a laser at the first station, the reference signal having a predetermined coding associated with the first reference frame, wherein the predetermined coding of the reference signal is a linear polarization of the reference signal, and wherein an orientation of polarization of the reference signal depends on the orientation of the first reference frame;
    splitting the received reference signal from the laser into at least first and second substantially orthogonal optical components with respect to the second reference frame by way of an optical device in the form of a polarized beam splitter (PBS);
    measuring first and second intensities of the first and second components of the split reference signal, wherein the measured intensities are functions of characteristics of at least the optical device, and relative orientations of the reference signal coding with respect to the second reference frame;
    correcting the measured first and second intensities for dependency on an intensity of the reference signal and/or to account for non-ideal characteristics of the PBS; and
    using the corrected measured first and second intensities to determine an approximate angle of deviation, if any, between first and second reference frames.

2. The method as claimed in claim 1, wherein the method comprises:
    characterizing the PBS; and
    determining an error function associated with the characterized PBS, wherein the error function is operable to compensate for non-ideal characteristics of the PBS.

3. The method as claimed in claim 2, wherein the method comprises:
    normalizing the received first and second intensities of the first and second components with respect to their combined total power; and
    applying the error function associated with the PBS to the normalized first and second intensities so as to correct or compensate for the non-ideal characteristics of the PBS.

4. The method as claimed in claim 1, wherein the method comprises receiving the reference signal at an identical orientation in the second reference frame as it was created in the first reference frame.

5. The method as claimed in claim 3, wherein the method comprises using the corrected or compensated first and second intensities and pre-determined trigonometric ratios to determine an approximate angle of deviation.

6. A system for identifying and/or measuring an orientation mismatch and/or relative angular velocity between at least two spaced apart stations including a first station and a second station, wherein the first station has an associated first reference frame and the second station has an associated second reference frame, the system comprising:
    an optical device configured to receive a reference signal from the first station, the reference signal having a predetermined coding associated with the first reference frame, wherein the predetermined coding of the reference signal is a linear polarization of the reference signal, and wherein an orientation of polarization of the reference signal depends on the orientation of the first reference frame; wherein the optical device is an optical beam splitter in the form of a polarized beam splitter (PBS) configured to split the received reference signal into first and second substantially orthogonal optical components with respect to the second reference frame;
    a first optical sensor configured to measure a first intensity of the first component of the reference signal, wherein the measured first intensity is a function of one or more of characteristics of the optical device, relative orientation of the reference signal coding with respect to the second reference frame, and transmitter of the reference signal;
    a second optical sensor configured to measure a second intensity of the second component of the reference signal, wherein the measured second intensity is a function of one or more of the characteristics of the optical device, relative orientations of the reference signal coding with respect to the second reference frame, and transmitter of the reference signal; and
    one or a combination of a processor and discrete electronic components configured to correct the measured first and second intensities for at least characteristics of the optical device, and wherein the one or a combination of a processor and discrete electronic components is configured to use the corrected measured first and second intensities to determine an approximate angle of deviation, if any, between first and second reference frames.

7. The system as claimed in claim 6, wherein the system comprises a laser located at the first station, wherein the laser is configured to generate and transmit a reference signal in the form of a laser signal or beam with predetermined coding.

8. The system as claimed in claim 7, wherein the predetermined coding of the reference signal is a linear polarization thereof, and wherein the orientation of polarization of the reference signal depends on the orientation of the first reference frame.

9. The system as claimed in claim 8, wherein the system is operable to:
    normalize the received first and second intensities of the first and second components with respect to their combined total power;
    apply an error function associated with the PBS to the normalized first and second intensities so as to correct or compensate for non-ideal characteristics of the PBS; and
    use the corrected or compensated first and second intensities and pre-determined trigonometric ratios to determine an approximate angle of deviation between the first and second reference frames.

10. A non-transitory computer-readable medium storing a set of computer-readable instructions that, when executed by a suitable computing device, causes the suitable computing device to:
   receive, from a first optical sensor, a measurement of a first intensity of a component of a reference signal split by an optical device in the form of a polarized beam splitter (PBS) at a second station having a second reference frame, wherein the reference signal is emitted from a laser at a first station and has a predetermined coding associated with the first station, wherein the first station has a first reference frame, wherein predetermined coding of the reference signal is a linear polarization of the reference signal, and wherein an orientation of polarization of the reference signal depends on the orientation of the first reference frame;
   receive, from a second optical sensor, a measurement of a second intensity of another component of the reference signal split by the optical device at the second station;
   correct the measured first and second intensities for dependency on an intensity of the reference signal and/or to account for non-ideal characteristics of the PBS; and
   use the received first and second intensities to determine an angle of deviation, if any, between first and second reference frames.

* * * * *